(12) United States Patent
Sellak et al.

(10) Patent No.: US 10,633,496 B2
(45) Date of Patent: Apr. 28, 2020

(54) METHOD FOR APPLYING, TO AN INORGANIC SURFACE, A PVC COMPOSITION HAVING IMPROVED ADHESION TO SURFACES

(71) Applicant: RESINOPLAST, Reims (FR)

(72) Inventors: Radouane Sellak, Bethoncourt (FR); Saloua Kharij, Witry-les-Reims (FR); Virginie Eva Severine Duprez, Reims (FR)

(73) Assignee: RESINOPLAST, Reims (FR)

( * ) Notice: Subject to any disclaimer, the term of this patent is extended or adjusted under 35 U.S.C. 154(b) by 165 days.

(21) Appl. No.: 15/776,565

(22) PCT Filed: Dec. 5, 2016

(86) PCT No.: PCT/EP2016/079790
§ 371 (c)(1),
(2) Date: May 16, 2018

(87) PCT Pub. No.: WO2017/093571
PCT Pub. Date: Jun. 8, 2017

(65) Prior Publication Data
US 2018/0340048 A1 Nov. 29, 2018

(30) Foreign Application Priority Data

Dec. 4, 2015 (FR) ..................... 15 61854

(51) Int. Cl.
| | | |
|---|---|---|
| *C08L 27/06* | (2006.01) |
| *C08K 5/057* | (2006.01) |
| *C08K 5/098* | (2006.01) |
| *C08K 5/29* | (2006.01) |
| *C08K 5/32* | (2006.01) |
| *C08J 5/10* | (2006.01) |
| *C08K 5/53* | (2006.01) |
| *C08K 5/544* | (2006.01) |
| *B29C 48/00* | (2019.01) |
| *C08K 7/14* | (2006.01) |
| *C08F 114/06* | (2006.01) |
| *C08F 214/06* | (2006.01) |
| *C08K 5/00* | (2006.01) |
| *C08F 14/06* | (2006.01) |

(52) U.S. Cl.
CPC ................. *C08J 5/10* (2013.01); *C08K 5/057* (2013.01); *C08K 5/098* (2013.01); *C08K 5/53* (2013.01); *C08K 5/544* (2013.01); *C08L 27/06* (2013.01); *B29C 48/022* (2019.02); *C08F 14/06* (2013.01); *C08F 114/06* (2013.01); *C08F 214/06* (2013.01); *C08J 2327/06* (2013.01); *C08K 5/0091* (2013.01); *C08K 5/29* (2013.01); *C08K 5/32* (2013.01); *C08K 7/14* (2013.01)

(58) Field of Classification Search
None
See application file for complete search history.

(56) References Cited

U.S. PATENT DOCUMENTS

| | | | | |
|---|---|---|---|---|
| 3,998,985 A | * | 12/1976 | Kitaj ................. | B32B 17/10688 |
| | | | | 427/386 |
| 4,277,538 A | | 7/1981 | Beckmann et al. | |
| 4,536,360 A | | 8/1985 | Rahrig | |
| 5,204,391 A | | 4/1993 | Nakata et al. | |
| 5,205,963 A | * | 4/1993 | Brito ................... | C08K 5/0041 |
| | | | | 252/301.16 |
| 5,261,721 A | | 11/1993 | Conger et al. | |
| 5,279,882 A | | 1/1994 | Daude et al. | |
| 5,593,786 A | | 1/1997 | Parker et al. | |
| 6,562,180 B1 | * | 5/2003 | Bohin ..................... | C08L 83/04 |
| | | | | 156/306.3 |
| 2011/0052809 A1 | | 3/2011 | Huck et al. | |

FOREIGN PATENT DOCUMENTS

| | | | | |
|---|---|---|---|---|
| CN | 1171080 A | 1/1998 | | |
| CN | 1292020 A | 4/2001 | | |
| CN | 101998981 A | 3/2011 | | |
| CN | 103788677 A | 5/2014 | | |
| DE | 4034152 A1 | 5/1991 | | |
| FR | 1443750 A | 6/1966 | | |
| GB | 772675 A | * | 4/1957 | ............. D21H 17/12 |
| GB | 1113635 | 5/1968 | | |
| GB | 1113635 A | * | 5/1968 | ........... C09D 127/06 |
| GB | 9626654 | 2/1997 | | |
| GB | 2320503 A | * | 6/1998 | ............. C09J 127/06 |
| GB | 2320503 A | 6/1998 | | |

OTHER PUBLICATIONS

First Office Action issued in corresponding Chinese Patent Application No. 2016800700756.0, dated Jul. 30, 2019, 5 pages.
Search Report issued in corresponding French Patent Application No. 1561854, dated Jun. 30, 2016, 2 pages.
Database WPI Week 201446, Thomson Scientific, London, GB; AN 2014-M99398, CN103788677, May 14, 2014, 2 pages.
International Search Report issued in connection with International Patent Application No. PCT/EP2016/079790, dated Mar. 13, 2017, 4 pages.

* cited by examiner

*Primary Examiner* — Richard A Huhn
(74) *Attorney, Agent, or Firm* — Duane Morris LLP

(57) ABSTRACT

The present invention relates to a method for applying, to an inorganic surface, a self-adhesive PVC composition which comprises a composition (C) comprising:
  an optionally protected aminosilane; and
  at least one compound selected from a titanium complex, a zirconium complex and an optionally protected isocyanate compound;
said method comprising a step of activating said surface, selected from heat treatment, a shot-peening step, a plasma treatment step, cleaning With solvent and a step of silica application.

11 Claims, No Drawings

METHOD FOR APPLYING, TO AN INORGANIC SURFACE, A PVC COMPOSITION HAVING IMPROVED ADHESION TO SURFACES

CROSS-REFERENCE TO RELATED APPLICATIONS

This application is a U.S. national stage application under 35 U.S.C. § 371 of International Application No. PCT/EP2016/079790, filed Dec. 5, 2016, which claims priority to French patent application No. 1561854, filed Dec. 4, 2015, the entireties of which are incorporated herein by reference.

The present invention pertains to a method for applying a PVC composition (polyvinyl chloride), having improved adhesion, to an inorganic surface. The present invention also relates to a PVC composition (polyvinyl chloride) that in particular is self-adhesive having improved surface adhesion to surfaces, particularly to glass or metal surfaces such as steel. The present invention notably concerns the automotive sector and more particularly the adhesion of PVC seals around a quarter glass window.

In the automotive sector, the encapsulating technique of quarter glass windows particularly consists of injecting a thermoplastic material around a window. In general, the encapsulating of windows using thermoplastic elastomers (TPEs), more particularly PVC, requires treatment whereby an activator layer and a primer layer are deposited, in particular manually, around the window intended to be encapsulated to ensure adhesion between the surface of the glass and the thermoplastic elastomer. The window thus treated is placed in a mould for encapsulation.

The use is known from WO9614985 of a self-adhering interlayer on the glass which comprises a support layer comprising plasticized PVC and a copolymer adhesive layer. It is therefore necessary to add an intermediate layer of copolymers so that the PVC film adheres to the glass. PVC on its own does not have any adhesion properties. However, the presence of an intermediate layer does not allow adhesion of sufficient quality and the system obtained (glass/intermediate layer/PVC) is peelable.

It is also known from GB2320503 and U.S. Pat. No. 4,277,538 to add silane to the PVC composition to make it self-adhering to glass.

The chief disadvantages of the above-mentioned systems first concern the field of application since the implementation method is solely reserved for calendering whereas the present technology extends to any type of transformation and preferably to injection or extrusion. Secondly, the thickness of the claimed plasticized PVC layer remains narrow, being between 0.1 µm and 20 mm. It is therefore not possible to apply thicker layers of PVC whilst preserving adhesive properties.

There would therefore be an advantage in providing an improved method for applying, to an inorganic surface, a PVC composition that has improved surface adhesion properties on an inorganic surface, and an advantage in providing a PVC composition having surface adhesion properties.

It is the objective of the present invention to provide an improved method for applying a PVC composition having surface adhesion properties onto an inorganic surface.

A further objective of the present invention is to provide an additive which, when added to a PVC composition, can impart self-adhering properties thereto.

A further objective of the present invention is to provide said self-adhesive PVC composition having improved surface adhesion properties compared with technologies in the prior art.

A further objective of the present invention is to provide said composition able to be used over a wide range of thicknesses without deteriorating quality of adhesion.

A still further objective of the present invention is to provide a method for preparing this composition.

Other objectives will become apparent on reading the following description.

The aforementioned objectives are reached with the present invention that concerns a method for applying, to an inorganic surface, a self-adhesive PVC composition comprising a composition (C) that comprises:
- an optionally protected aminosilane; and
- at least one compound selected from among a titanium complex, zirconium complex and/or an optionally protected isocyanate compound;

said method comprising an activation step of said surface selected from among heat treatment, a shot peening step, plasma treatment step, solvent cleaning or a silicification step.

The present invention also concerns a composition (C) comprising at least one aminosilane and at least one titanium complex and/or at least one zirconium complex.

The composition (C) may also comprise at least one compound selected from a titanium complex.

The present invention also describes composition (C') comprising an optionally protected aminosilane; and
at least one compound selected from among a titanium complex, zirconium complex and/or an optionally protected isocyanate compound.

The present invention is particularly directed towards inorganic surfaces in the automotive sector. Preferably, according to the invention, the surface is a surface in glass, metal or ceramic, preferably glass or metal. The metal surface is preferably in iron or steel surface, preferably stainless steel, aluminium, copper, bronze, nickel, zinc, etc. In one preferred embodiment, the inorganic surface is a glass surface.

In another preferred embodiment, the inorganic surface is a surface in stainless steel or aluminium.

According to the invention, the composition (C) comprises an optionally protected aminosilane; and at least one compound selected from among a titanium complex, zirconium complex or an optionally protected isocyanate compound.

Preferably, in the present invention, the aminosilane is selected from among silanes functionalised by an amino chemical group, alone or in a mixture. Preferably the aminosilane is selected from among aminosilane having a primary or secondary amine function, preferably a primary amine function. The amine function may be protected by any function known to persons skilled in the art to protect the amine function and release the amine function at high temperature, in particular at a temperature of between 100 and 250° C., preferably between 150 and 210° C. Preferably, the protective function of the amine function is an alkoxycarbonyl function, the alkyl being C1 to C10 and linear or branched, preferably the protective function is tert-butoxycarbonyl.

Particularly advantageously, the protection of the amine function allows protection of the aminosilane when using the PVC composition at high temperature, in particular at between 150 and 220° C., preferably between 170 and 200° C. At these temperatures, the amine function is released and is then able react with the PVC. The presence of the protective function also allows an increase in the concentration of aminosilane in the composition (C) of the invention or in the PVC composition, and advantageously allows improved self-adhesive properties of the PVC composition obtained. The presence of the function protecting the amine function also allows improved storage stability of the PVC composition before use.

The aminosilane of the invention may notably be a compound of formula (I):

where:
R, all the same or different, is a linear or branched alkyl chain having 1 to 15 carbon atoms, preferably 1 to 10 carbon atoms, preferably 1 to 5 carbon atoms e.g. methyl, ethyl;
$L^1$ is Alk, Alk-$NR^2$-Alk or Alk-$NR^2$-Alk-$NR^2$-Alk, Alk, the same or different, being a linear or branched alkyl chain having 1 to 15 carbon atoms, preferably 1 to 10 carbon atoms, preferably 1 to 5 carbon atoms;
$R^1$ is $NHR^2$ or $Si(OR)_3$;
$R^2$, all the same or different, is a hydrogen atom or C(O)-alkyl group, the alkyl linear or branched having 1 to 10 carbon atoms, preferably C(O)-tBu.

Preferably the aminosilane is selected from among the following compounds, alone or in a mixture:

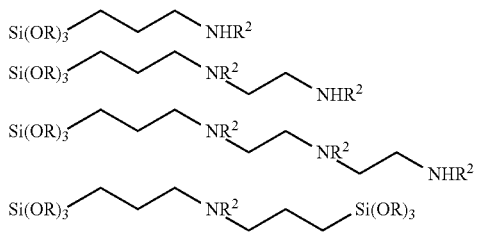

where:
R, all the same or different, is a linear or branched alkyl chain having 1 to 15 carbon atoms, preferably 1 to 10 carbon atoms, preferably 1 to 5 carbon atoms, e.g methyl, ethyl;
$R^2$, all the same or different, is a hydrogen atom or C(O)-alkyl group, the alkyl linear or branched having 1 to 10 carbon atoms, preferably C(O)-tBu.

In particularly preferred manner, the aminosilane is selected from among 3-aminopropyltriethoxysilane and 3-trimethoxysilylpropyldiethylenetriamine, alone or in a mixture. In particular the aminosilane, and especially the preferred examples given above, is protected by a tert-butoxycarbonyl functional group.

Preferably, in the present invention, the titanium complexes and/or zirconium complexes can be used alone or in a mixture.

Preferably, the titanium complexes are selected from among the complexes of formula $(R^3O-)_n Ti(O-X-R^4-Y)_{4-n}$ where:
$R^3$ is a linear or branched alkyl chain having 1 to 15 carbon atoms, preferably 1 to 10 carbon atoms, preferably 1 to 5 carbon atoms;
$R^4$ is a linear or branched alkyl chain having 1 to 15 carbon atoms, preferably 1 to 10 carbon atoms, preferably 1 to 5 carbon atoms, optionally substituted by one or more =O;
X is a C=O or P=O group;
Y is an amine function ($NH_2$) or else a linear or branched alkyl chain having 1 to 5 carbon atoms, preferably $CH_3$, optionally substituted by one or more =O;
n is an integer of between 0 and 4, preferably 1, 2 or 3.

The titanium complex is preferably selected from among tetra-n-butyl titanate and Bis[2-[(2-aminoethyl)amino]ethanolato][2-[(2-aminoethyl)amino]ethanolato-O](propan-2-olato)titanate, alone or in a mixture.

Preferably, the zirconium complexes are selected from among the complexes of formula $(R^3O-)_n Zr(O-X-R^4-Y)_{4-n}$ where:
$R^3$ is a linear or branched alkyl chain having 1 to 15 carbon atoms, preferably 1 to 10 carbon atoms, preferably 1 to 5 carbon atoms;
$R^4$ is a linear or branched alkyl chain having 1 to 15 carbon atoms, preferably 1 to 10 carbon atoms, preferably 1 to 5 carbon atoms, optionally substituted by one or more =O;
X is a C=O or P=O group;
Y is an amine function ($NH_2$) or else a linear or branched alkyl chain having 1 to 5 carbon atoms, preferably $CH_3$, optionally substituted by one or more =O;
n is an integer of between 0 and 4, preferably 1, 2 or 3.

Preferably, in the present invention, the isocyanate is selected from among monofunctional, difunctional or polyfunctional isocyanates. In particular the isocyanate can be selected from among aliphatic, aromatic and alicyclic isocyanates and polyisocyanates.

Preferably, in the present invention, the isocyanate can be selected from among:
polyisocyanates derived from monomer isocyanates such as hexamethylene diisocyanate (HDI), toluene diisocyanate, isophorone diisocyanate (IPDI), diphenylmethylene diisocyanate (MDI), or polymerized diphenylmethylene diisocyanate (PMDI);
the compounds of formula (I):

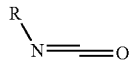

where R is:
a linear or branched alkyl chain having 1 to 15 carbon atoms, preferably 1 to 10 carbon atoms, preferably 1 to 5 carbon atoms, or
an aryl group having 6 to 15 carbon atoms, preferably 6 to 10 carbon atoms, or
a cycloalkyl group having 3 to 15 carbon atoms, preferably 3 to 10 carbon atoms,
the R group possibly comprising 1 to 10, preferably 1 to 5 heteroatoms selected from among N, O, S, and/or being substituted by a functional group selected from among hydroxyl, isocyanate, allophanate, amino groups;
the compounds of formula (II)

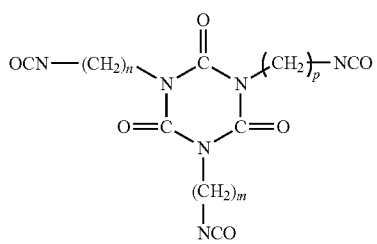

with n, m and p, the same or different, being integers of between 1 and 10.

Preferably, according to the invention, the isocyanate is selected from among polyisocyanates derived from monomer isocyanates such as hexamethylene diisocyanate (HDI), toluene diisocyanate, isophorone diisocyanate (IPDI), diphenylmethylene diisocyanate (MDI), or polymerized diphenylmethylene diisocyanate (PMDI). Preferably, it is selected from among the Desmodur® compounds marketed by Covestro, in particular the HDI compounds. Preferably, the isocyanate included in the composition (C) is Desmodur® BL 3272 MPA.

Preferably, according to the invention, the isocyanate function of the isocyanate can be protected by any function known to skilled persons for protecting isocyanates, in particular any protective function known to skilled persons to protect the isocyanate function and release the isocyanate function at high temperature, in particular at a temperature of between 100 and 250° C., preferably between 150 and 210° C. Preferably, the protective function of the isocyanate function is selected from among imine, alcohol, ketoxime, amide, thiol functions, preferably the protective function of the isocyanate function is an imine function. Preferably, when the protective function is selected from among imines, it is selected from among 2-oxohexamethyleneimine or succinimide. Preferably, when the protective function is selected from among alcohols, it is selected from among 2-trifluoroethanol, 2-trichloroethanol, n-butanol, 2,6-dimethylphenol or cardanol. Preferably, when the protective function is a ketoxime, it is selected from among methyl ethyl ketoxime or diisopropyl ketoxime. Preferably, when the protective function is a thiol it is a hexane thiol. Preferably when the protective function is an amide, it is caprolactam. Preferably, the protective function is 2-oxohexamethyleneimine.

In particularly advantageous manner, the protection of the isocyanate function allows protection of the isocyanate when using the PVC composition at high temperature, in particular at between 100 and 200° C., preferably between 140 et 180° C. At these temperatures, the isocyanate function is released and is then able to react with the PVC. The presence of the protective function also allows an increase in the concentration of isocyanate in the composition (C) of the invention or in the PVC composition, and advantageously allows the imparting of improved self-adhesive properties to the PVC composition obtained.

Advantageously, when the self-adhesive PVC composition comprises a protected aminosilane and/or isocyanate, the storage stability of the composition, before application to the surface, is improved compared with a PVC composition comprising a non-protected aminosilane and/or isocyanate.

According to the present invention, the alkyl groups represent linear or branched, saturated hydrocarbon radicals having 1 to 15 carbon atoms, preferably 1 to 10 carbon atoms, preferably 1 to 5 carbon atoms.

If they are linear, mention can be made of the methyl, ethyl, propyl, butyl, pentyl, hexyl, octyl, nonyl, decyl, dodecyl, hexadecyl and octadecyl groups.

If they are branched or substituted by one or more alkyl groups, mention can particularly be made of isopropyl, tert-butyl, 2-ethylhexyl, 2-methylbutyl, 2-methylpentyl, 1-methylpentyl and 3-methylheptyl groups.

The cycloalkyl radical is a mono-, bi- or tri-cyclic hydrocarbon radical, saturated or partly unsaturated, non-aromatic having 3 to 15 carbon atoms, preferably 3 to 10 carbon atoms, such as cyclopropyl, cyclopentyl, cyclohexyl or adamantyl in particular, and the corresponding rings containing one or more unsaturations.

Aryl designates a mono- or bicyclic aromatic hydrocarbon system having 6 to 15 carbon atoms, preferably 6 to 10 carbon atoms. Among the aryl radicals, particular mention can be made of the phenyl or naphthyl radical, more particularly substituted by at least one halogen atom.

Preferably, in the invention, composition (C) comprises:
an optionally protected aminosilane, such as defined above; and
an optionally protected isocyanate, such as defined above.

Preferably, in the invention, composition (C) comprises:
an optionally protected aminosilane, such as defined above; and
a titanium complex such as defined above.

Preferably, in the invention, composition (C) comprises:
an optionally protected aminosilane, such as defined above; and
a zirconium complex such as defined above.

Preferably, in the invention, composition (C) comprises:
an optionally protected aminosilane, such as defined above;
a titanium complex, such as defined above; and
a zirconium complex, such as defined above.

Preferably, in the invention, composition (C) comprises:
an optionally protected aminosilane, such as defined above;
am optionally protected isocyanate, such as defined above; and
a titanium complex such as defined above.

Preferably, in the invention, composition (C) comprises:
an optionally protected aminosilane, such as defined above;
an optionally protected isocyanate, such as defined above; and
a zirconium complex such as defined above.

Preferably, in the invention, composition (C) comprises:
an optionally protected aminosilane, such as defined above;
an optionally protected isocyanate, such as defined above;
a titanium complex, such as defined above; and
a zirconium complex, such as defined above.

Depending on the type of inorganic surface, the composition (C) used may vary.

Preferably, if the surface is in glass, composition (C) comprises an optionally protected aminosilane and an optionally protected isocyanate, or an optionally protected aminosilane and a titanium complex. Advantageously, if the surface is in glass, composition (C) comprises a protected aminosilane and a protected isocyanate, or a non-protected aminosilane and a titanium complex.

Preferably, if the surface is in metal, composition (C) comprises an optionally protected aminosilane and a protected isocyanate, or an optionally protected aminosilane and a titanium complex. Preferably, if the surface is in metal, composition (C) comprises a protected aminosilane and a protected isocyanate, or an optionally protected aminosilane and a titanium complex.

The composition (C) of the present invention preferably comprises from 86 to 90% by weight of aminosilane, preferably from 83 to 87%.

The composition (C) of the present invention preferably comprises from 10 to 14% by weight of a compound selected from among a titanium complex, zirconium complex and an optionally protected isocyanate, preferably from 13 to 17% by weight. Preferably, when composition (C) of the present invention comprises an optionally protected isocyanate, it is contained in an amount ranging from 10 to 13% by weight.

When the composition (C) comprises an aminosilane and a titanium complex and/or zirconium complex, composition (C) of the present invention preferably comprises from 86 to 90% by weight of aminosilane, preferably from 83 to 87%, and preferably from 10 to 14% by weight of titanium complex and/or zirconium complex, preferably from 13 to 17% by weight.

Preferably, the present invention concerns a composition (C) formed of at least one aminosilane and at least one titanium complex and/or at least one zirconium complex.

Preferably, the composition (C) consists of at least one aminosilane and at least one titanium complex.

The composition (C) of the present invention may also comprise compounds contributing surface adhesive functions e.g. a terpolymer of ethylene, methyl acrylate and glycidyl methacrylate type (Lotader AX8900, supplier: Arkema), products containing isocyanate chemical functions.

In the present invention, by «PVC composition» it is meant to designate a composition comprising a PVC resin. Any type of PVC resin can be used, in particular PVC resins in suspension or in emulsion.

The PVC composition of the invention comprises a composition (C) such as defined above.

The inventors have surprisingly shown that the composition (C) of the invention can be added to the PVC composition preferably in an amount of less than 35% by weight relative to the weight of PVC resin, preferably at between 5 and 25% by weight, more preferably at between 7 et 20% by weight, for example at 10% by weight. These proportions advantageously allow a trade-off between preserved stability, especially heat stability of the PVC, and the imparting of good adhesive properties to the PVC.

In particularly advantageous manner, the addition of the composition (C) of the invention to a PVC composition allows the imparting of adhesive properties to said PVC composition. With the present invention, it is possible to reach peel strengths higher than 20 N, preferably this technology allows adhesive strengths higher than 40 N to be reached.

The present invention also concerns a method for imparting self-adhesive properties to a PVC composition, which comprises adding a composition (C) of the invention to said PVC composition. The self-adhesive properties being in respect of surfaces of glass or steel in particular.

Preferably, the composition (C) is added to said PVC composition in a proportion of less than 30% by weight relative to the weight of PVC resin, preferably at between 1 and 25% by weight, more preferably at between 7 and 20% by weight, for example at 10% by weight.

In particularly advantageous manner, the addition of composition (C) of the invention to a PVC composition allows the imparting of adhesive properties to said PVC composition, properties of adhering to surfaces in glass or steel in particular. With the present invention, it is possible to reach peel strengths higher than 20 N, preferably this technology allows adhesive strengths higher than 40 N to be reached.

By «surface activation» in the invention it is meant a step performed prior to application of the PVC composition onto the inorganic surface, and which allows the imparting to said surface of characteristics allowing improved adhesion of the PVC composition.

This surface activation step is carried out so that said surface is adapted for application of a PVC composition and has improved cling, wettability, contact surface temperature and fast adhering characteristics.

Preferably, the surface activation step is selected from among heat treatment, shot peening, solvent cleaning, silicification or plasma treatment.

By heat treatment in the meaning of the invention, it is meant surface treatment via the action of heat to modify the physical and optionally chemical properties of said surface. The heat can be provided by induction (hot plates) or convection (oven). For heat treatment, the surface is heated to a temperature of between 50° C. and 500° C., preferably between 200 and 400° C., e.g. 350° C. Preferably, the heat treatment uses radiating heat i.e. heating the surface via infrared radiation up to a temperature of between 50° C. and 500° C., preferably between 200 and 400° C., e.g. 350° C. Preferably, when the activation step uses radiating heat, the exposure time is between 10 seconds and 10 minutes, preferably between 30 seconds and 60 seconds, for example the exposure time is 40 seconds.

By shot peening in the meaning of the invention, it is meant surface treatment via impact whereby microbeads are projected onto a surface for the purpose of scaling the surface without damaging it or creating surface roughness. In general, the microbeads are in glass and are characterized by a specific size of between 10 and 20 microns.

By plasma treatment in the meaning of the invention, it is meant surface treatment using a plasma torch and in the presence of a vector gas, such as dinitrogen. This surface treatment reduces the roughness of the treated surface. With this treatment it is also possible to activate the surface by increasing the wettability and functionality thereof (through the providing of free radicals).

By solvent cleaning in the meaning of the invention, it is meant surface treatment using any type of solvent known to skilled persons. In particular, the solvent can be selected from among ketones e.g. methyl-ethyl-ketone, acetone, or from among alcohols, preferably ethanol. Preferably, the solvent is methyl-ethyl-ketone. This solvent cleaning is conducted at ambient temperature, preferably at a temperature of between 15° C. and 25° C., the amount of solvent being determined by those skilled in the art.

By silicification in the meaning of the invention, it is meant a method allowing the depositing of a $SiO_2$ coating on the inorganic surface, in particular a metal surface to promote adhesion to said surface of the PVC composition comprising compounds of aminosilane, isocyanate or a titanium and/or zirconium complex.

Advantageously, according to the invention several of these steps can be combined. Preferably, the solvent cleaning step is followed by activation via heat treatment or plasma treatment.

Advantageously, the surface activation step is a specific method allowing a reduction in cycle time. By cycle time in the meaning of the invention, it is meant the time needed for the PVC composition comprising composition (C) to adhere to the surface. Preferably, the activation step is a specific method promoting adhesion of the PVC composition onto the surface without the use of a primer and adhesive, within an acceptable cycle time. Preferably, this activation step allows avoiding of the recourse to a secondary treatment such as removal of burrs or application of pressure.

Depending on the surface and composition (C) of the invention, the activation step may differ.

Preferably, if the surface is in glass, the activation step is selected from among heat treatment, solvent cleaning or plasma treatment. Advantageously, if the surface is in glass, the activation step may comprise a solvent cleaning step followed by heat treatment or plasma treatment.

Preferably, if the surface is in metal, the activation step is selected from among solvent cleaning, heat treatment, shot peening, plasma treatment or silicification. Advantageously, if the surface is in metal, the activation step may comprise a solvent cleaning step followed by heat treatment or plasma treatment. Advantageously if the surface is in metal, the surface activation step is shot peening.

Preferably, according to the invention, if the surface is in glass, the surface activation treatment is heat treatment and the composition (C) comprises an optionally protected aminosilane and a protected isocyanate, or an optionally protected aminosilane and a titanium complex. Preferably, if the surface is in glass, the surface activation treatment is heat treatment and the composition (C) comprises a protected aminosilane and a protected isocyanate, or a non-protected aminosilane and a titanium complex.

Preferably, according to the invention, if the surface is in metal, the surface activation treatment is heat treatment and the composition (C) comprises an optionally protected aminosilane and a protected isocyanate, or an optionally protected aminosilane and a titanium complex. Preferably, if the surface is in metal, the surface activation treatment is heat treatment and the composition (C) comprises a protected aminosilane and a protected isocyanate, or an optionally protected aminosilane and a titanium complex.

According to the invention, the application of the PVC composition to the inorganic surface is conducted, after the surface treatment step, by injection moulding, extrusion, rotational moulding or compression moulding, preferably by extrusion.

By injection moulding in the meaning of the invention, it is meant a method for transforming a PVC composition comprising the following steps:
heating the composition to a temperature of between 140° C. and 230° C., preferably between 160° C. and 190° C.;
injecting the PVC composition in liquid form into a mould;
cooling the mould and the composition down to a temperature below the melting point of the PVC composition;
releasing from the mould.

By extrusion in the meaning of the invention, it is meant a method for transforming a PVC composition, comprising the following steps:
optionally heating the composition to a temperature of between 20° C. and 400° C., preferably between 100° C. and 300° C., more preferably between 150° C. and 250° C.;
compressing the heated composition through a die having the cross-section of the part to be obtained;
cooling the part.

By rotational moulding in the meaning of the invention, it is meant a method whereby the PVC composition is transformed under a supply of heat and under rotational effect, and comprising the following steps:
filing a mould with the PVC composition optionally in the form of a mixture of powders or in liquid form;
rotating the mould, the most often around two perpendicular axes;
heating the mould to between 200° C. and 500° C., preferably between 300° C. and 400° C., more preferably between 350° C. and 400° C.;
cooling the mould and the composition down to a temperature below the melting point of the PVC composition;
releasing from the mould.

By compression moulding in the meaning of the invention, it is meant the application of a PVC composition in powder, granule, semi-solid form or preformed, onto a surface. For compression moulding, the mould in which the raw materials are placed is heated to a temperature of between 50 and 100° C. before being closed and pressed, the pressure then being between 50 and 300 bars to force the material to fill the mould, the excess material being evacuated via channels provided for this purpose, before the mould is cooled and opened to recover the moulded object.

Preferably, according to the invention, if the surface is in glass, the surface activation treatment is heat treatment and the composition (C) comprises an optionally protected aminosilane and a protected isocyanate, or an optionally protected aminosilane and a titanium complex, and the PVC composition is applied by extrusion. Preferably, if the surface is in glass, the surface activation treatment is heat treatment and the composition (C) comprises a protected aminosilane and a protected isocyanate, or a non-protected aminosilane and a titanium complex, and the PVC composition is applied by extrusion.

Preferably, according to the invention, if the surface is in metal, the surface activation treatment is heat treatment and the composition (C) comprises am optionally protected aminosilane and a protected isocyanate, or an optionally protected aminosilane and a titanium complex, and the PVC composition is applied by extrusion. Preferably, if the surface is in metal, the surface activation treatment is heat treatment and the composition (C) comprises a protected aminosilane and a protected isocyanate, or an optionally protected aminosilane and a titanium complex, and the PVC composition is applied by extrusion.

The present invention also concerns a self-adhesive PVC composition comprising PVC and a composition of the invention.

Advantageously, the composition (C) of the invention must be compatible, miscible, or homogenized with the PVC composition. In particularly advantageous manner, the composition (C) of the invention must be soluble in the PVC composition and must be able to diffuse from the PVC composition towards the PVC-surface interface during the implementation process so that it can play its adhesion role via chemical reaction with the PVC and the surface on which the PVC is to adhere.

The inventors have surprisingly shown that the composition (C) of the invention can be added to the PVC composition preferably in a proportion of less than 35% by weight relative to the weight of the PVC resin, preferably between 5 and 25% by weight, more preferably between 7 and 20% by weight, for example 10% by weight. These proportions advantageously allow a trade-off between preserved stability, especially heat stability of the PVC, and the imparting of good adhesive properties to the PVC.

The PVC composition of the present invention may also comprise at least one plasticizer, selected in particular from among phthalates, trimellitates, terephthalates, citrates, polymeric plasticizers of polyadipate, polyester sebacate type.

Preferably, the plasticizer is used in the PVC composition of the invention in a proportion of 1 to 70% by weight relative to the weight of PVC, preferably from 20 to 40% by weight.

In particularly advantageous manner, the composition (C) of the invention is miscible, compatible or homogenized in the plasticizer or plasticizer mixture used.

Particularly advantageously, the composition (C) of the invention is soluble in the plasticizer or plasticizer mixture used.

The PVC composition of the present invention may further comprise usual additives among which stabilisers can be cited e.g. Ca/Zn; co-stabilisers e.g. phosphites and antioxidants.

Preferably, these additives are contained in the PVC composition of the invention in a proportion of 1 to 30% by weight relative to the weight of the PVC, preferably 7 to 5 by weight.

The PVC composition of the invention advantageously has surface adhesion properties, in particular on glass or steel surfaces, mainly on glass surfaces.

The adhesive strengths of the flexible PVC on glass surfaces were measured with a peel test. With the present invention, it is possible to reach peel strengths higher than 20 N, preferably this technology allows adhesive strengths higher than 40 N to be reached.

Failure of cohesive type occurs in the material itself, contrary to failure of adhesive type which occurs at the interface of the two assembled materials.

In the present invention, failure is defined as cohesive when the peel force is higher than 40N on a surface of glass or metal type.

The invention further concerns the use of the composition (C) of the invention in a PVC composition to impart surface adhesion properties to said PVC composition, in particular glass or steel surfaces.

The present invention also concerns a method for preparing the composition (C) which comprises mixing at least one optionally protected aminosilane with at least one compound selected from among an optionally protected isocyanate, a titanium complex and/or at least one zirconium complex.

The present invention also concerns a method for preparing the composition (C) which comprises mixing at least one aminosilane with at least one titanium complex and/or at least one zirconium complex.

The present invention also concerns a method for preparing the PVC composition defined above, comprising mixing of the composition (C) of the invention with the PVC resin and optional other components of the composition (plasticizer, additives . . . ).

Preferably, the PVC composition of the invention also comprises at least one plasticizer. In this embodiment, the method for preparing the PVC composition comprises a first step to mix the composition (C) of the invention with the plasticizer(s), followed by addition of the mixture obtained to the PVC resin with the optional additives.

In another embodiment, the composition (C) of the invention can be added at the time of compounding.

The present invention also concerns the use of the PVC composition of the invention to encapsulate a glass panel, in particular to encapsulate a glass panel in the automotive sector, to prepare a reinforced PVC product e.g. PVC reinforced with glass fibres, the presence of the composition (C) of the invention allowing improved adhesion of the PVC to the glass fibres. The present invention is particularly adapted for encapsulating a quarter glass window in a PVC composition. The present invention also concerns seals comprising the PVC composition of the invention, in particular seals for encapsulating a glass panel.

Advantageously, the presence in the PVC composition of composition (C) of the invention allows direct adhesion without requiring the addition of an intermediate adhesion layer between the PVC and the surface to which it is to adhere.

Advantageously, the encapsulation of a glass panel in the PVC composition of the present invention can be obtained in different manners and in particular by injecting a seal around its support.

In particularly advantageous manner, it is possible to use a large amount of PVC composition of the invention around glass panels whilst maintaining good adhesive properties. It is therefore possible to provide layers of the composition of the invention having a thickness in the order of about 0.1 μm to about 30 mm around glass panels.

The present invention also concerns the use of the PVC composition of the present invention for all objects requiring adhesion between the PVC and galvanised steel and stainless steel e.g. to seal vehicle roof bars.

The present invention also concerns glass panels encapsulated in a PVC composition of the present invention, preferably quarter glass windows encapsulated in a PVC composition of the present invention. The encapsulated glass panel comprises a glass panel surrounded by the PVC composition of the invention. Preferably, it is possible to use a large amount of the PVC composition of the invention around glass panels whilst maintaining good adhesive properties. It is therefore possible to provide layers of the composition of the invention having a thickness in the order of about 0.1 μm to about 30 mm around glass panels.

In particularly advantageous manner, the encapsulated glass panels do not comprise an intermediate layer to allow adhesion between the PVC composition of the invention and the glass panel.

In particularly advantageous manner, the PVC composition of the present invention can be applied using any transformation means in particular by injection, extrusion or pressing.

The present invention is described below by means of nonlimiting descriptive examples.

Description of the Peel Test (Determination of Surface Adhesion)

The peel test measures the force (N) required to separate the PVC layer from the substrate of a supporting surface (glass or metal plate, preferably steel).

The PVC composition is deposited on a surface (glass or metal plate, preferably steel) measuring 50×10 cm. The assembly is placed in a gradient oven brought to a temperature of 200° C. to overmould the surface (glass or metal plate, preferably steel) with the PVC material.

The peel test is performed using a LLOYD Instrument tester (Ametek Company). The sample obtained is placed in tensile testing apparatus, the surface being immobile.

The test conditions are the following:
Crosshead speed: 100 mm/mi,
Maximum crosshead travel: 80 mm If peel force is higher than 40N, rupture is said to be cohesive and translates excellent adhesion of the composition to the substrate.

COMPARTIVE EXAMPLE 1

A PVC composition was prepared using a PVC base (Kwert 65) containing 30 weight % of T8 trimellitate plasticizer marketed by ADK Palmarole, 1.5 weight % of stabilizer (Ca/Zn), 0.5 weight % of co-stabilizer (phosphite-type antioxidant ADK STAB 1500, marketed by Adeka Palmarole), 2% Tetrabutyl titanate.

A glass surface was treated at ambient temperature with methyl-ethyl-ketone before being heated in an oven to 200° C.

The PVC composition was applied by extrusion (Escuyer 40) under the following conditions:
    die head temperature of 170° C., with a temperature profile of 160 to 180° C.; and
    extrusion rate of 35 rpm.
This composition did not exhibit any adhesion to the glass surface.

COMPARTIVE EXAMPLE 2

A PVC composition was prepared using a PVC base (Kwert 65) containing 30 weight % of T8 trimellitate plasticizer marketed by ADK Palmarole 1.5 weight % of stabilizer (Ca/Zn), 0.5 weight % of co-stabilizer (phosphite-type antioxidant, ADK STAB 1500, marketed by Adeka Palmarole), 2% of 3-(aminopropyl)triethoxysilane additive.

A glass surface was treated at ambient temperature with methyl-ethyl-ketone before being heated in an oven to 200° C.

The PVC composition was applied by extrusion (Escuyer 40) under the following conditions:
    die head temperature of 170° C., with a temperature profile of 160 to 180° C.; and
    extrusion rate of 35 rpm.
The peel force showed that adhesion strength was less than 20 N (adhesive failure) on the glass surface.

EXAMPLE 1—PVC COMPOSITION OF THE INVENTION

A PVC composition was prepared using a PVC base (Kwert 65) containing 29 weight % of T8-10 plasticizer, 1.5 weight % of stabilizer (Ca/Zn), 0.5 weight % of co-stabilizer, 2.9 weight % of 3-(aminopropyl)triethoxysilane and 1.5 weight % of Bis[2-[(2-aminoethyl)amino]ethanolato][2-[(2-aminoethyl)amino]ethanolato-O](propan-2-olato)titanate.

A glass surface was treated at ambient temperature with methyl-ethyl-ketone before being heated in an oven to 200° C.

The PVC composition was applied by extrusion (Escuyer 40) under the following conditions:
    die head temperature of 170° C., with a temperature profile of 160 to 180° C.; and
    extrusion rate of 35 rpm.
The adhesion strength measured by implementing the peel test was higher than 40 N on the glass surface. The heat stability of the material (measured at 200° C.) was 30 minutes.

EXAMPLE 2—PVC COMPOSITION OF THE INVENTION

A PVC composition was prepared using a PVC base (Kwert 65) containing 29 weight of T8-10 plasticizer, 1.5 weight % of stabilizer (Ca/Zn), 0.5 weight % of co-stabilizer, 2.9 weight % of 3-(aminopropyl)triethoxysilane protected by a tert-butoxycarbonyl function and 1.5 weight % of Bis[2-[(2-aminoethyl)amino]ethanolato][2-[(2-aminoethyl)amino]ethanolato-O](propan-2-olato)titanate.

A glass surface was treated at ambient temperature with methyl-ethyl-ketone before being heated in an oven to 200° C.

The PVC composition was applied by extrusion (Escuyer 40) under the following conditions:
    die head temperature of 170° C., with a temperature profile of 160 to 180° C.; and
    extrusion rate of 35 rpm.
The adhesion strength measured by implementing the peel test was higher than 40 N on the glass surface. The measured heat stability (at 200° C.) was 106 minutes.

EXAMPLE 3—PVC COMPOSITION OF THE INVENTION

A PVC composition was prepared using a PVC base (Kwert 65) containing 26 weight % of T8-10 plasticizer, 1.5 weight % of stabilizer (Ca/Zn), 0.5 weight % of co-stabilizer, 10 weight % of 3-(aminopropyl)triethoxysilane and 1.3 weight % of Tetrabutyl titanate.

A glass surface was treated at ambient temperature with methyl-ethyl-ketone before being heated in an oven to 200° C.

The PVC composition was applied by extrusion (Escuyer 40) under the following conditions:
    die head temperature of 170° C., with a temperature profile of 160 to 180° C.; and
    extrusion rate of 35 rpm.
The adhesion strength measured by implementing the peel test was higher than 40 N on the glass surface.

EXAMPLE 4—PVC COMPOSITION OF THE INVENTION

A PVC composition was prepared using a PVC base (Kwert 70) containing 27 weight % of T8-10 plasticizer, 1.5 weight % of stabilizer (Ca/Zn), 0.5 weight % of co-stabilizer, 5.3 weight % of 3-(aminopropyl)triethoxysilane protected by a tert-butoxycarbonyl function and 1.4 weight % of Bis[2-[(2-aminoethyl)amino]ethanolato][2-[(2-aminoethyl)amino]ethanolato-O](propan-2-olato)titanate.

A glass surface was treated at ambient temperature with methyl-ethyl-ketone before being heated in an oven to 200° C.

The PVC composition was applied by extrusion (Escuyer 40) under the following conditions:
    die head temperature of 170° C., with a temperature profile of 160 to 180° C.; and
    extrusion rate of 35 rpm.
The adhesion strength measured by implementing the peel test was higher than 40 N on the glass surface.

EXAMPLE 5—PVC COMPOSITION OF THE INVENTION

A PVC composition was prepared using a PVC base (Kwert 65) containing 29 weight % of T8-10, 1.5 weight % of stabilizer (Ca/Zn), 0.5 weight % of co-stabilizer, 2.9% of 3-(trimethoxysilylpropyl)diethylenetriamine protected by a tert-butoxycarbonyl function and 1 weight % of Tetrabutyl titanate.

A glass surface was treated at ambient temperature with methyl-ethyl-ketone before being heated in an oven to 200° C.

The PVC composition was applied by extrusion (Escuyer 40) under the following conditions:
    die head temperature of 170° C., with a temperature profile of 160 to 180° C.; and
    extrusion rate of 35 rpm.
The adhesion strength measured by implementing the peel test was higher than 40 N on the glass surface.

EXAMPLE 6: PVC COMPOSITION OF THE INVENTION

A PVC composition was prepared using a PVC base (Kwert 65) containing 29 weight % of T8-10, 1.5 weight % of stabilizer (Ca/Zn), 0.5 weight % of co-stabilizer, 5.8 weight % of 3-trimethoxysilylpropyl)diethylenetriamine and 1.4 weight % of Tetrabutyl titanate.

A glass surface was treated at ambient temperature with methyl-ethyl-ketone before being heated in an oven to 200° C.

The PVC composition was applied by extrusion (Escuyer 40) under the following conditions:
die head temperature of 170° C., with a temperature profile of 160 to 180° C.; and
extrusion rate of 35 rpm.

The adhesion strength measured by implementing the peel test was higher than 20 N on the glass surface and was lower than the strength of the material in Example 4.

COMPARTIVE EXAMPLE 3

A PVC composition was prepared using a PVC base (Kw 80) containing 42 weight % of DINP plasticizer, 1.7 weight % of stabilizer (Ca/Zn), 0.5 weight % of co-stabilizer (epoxidized soybean oil), 9 weight % of filler (CaCO3).

A glass surface was treated at ambient temperature with methyl-ethyl-ketone before being heated in an oven to 200° C.

The PVC composition was applied by extrusion (Escuyer 40) under the following conditions:
die head temperature of 170° C., with a temperature profile of 160 to 180° C.; and
extrusion rate of 35 rpm.

The peel strength measured by implementing the peel test on this material was about 2 N on the steel surface.

EXAMPLE 8 OF THE INVENTION

A PVC material was prepared under the same conditions as the material in Example 6 with the addition of 3-(trimethoxysilylpropyl)diethylenetriamine in a content of 1.2 weight with 0.7 weight % of tetrabutyl titanate.

A stainless steel surface was treated at ambient temperature with methyl-ethyl-ketone before being heated in an oven to 200° C.

The PVC composition was applied by extrusion (Escuyer 40) under the following conditions:
die head temperature of 170° C., with a temperature profile of 160 to 180° C.; and
extrusion rate of 35 rpm.

The peel strength measured by implementing the peel test was 55.6 N on the steel surface.

EXAMPLE 9 OF THE INVENTION

A PVC composition was prepared using a PVC base (Kwert 65) containing 26 weight % of T8-10 plasticizer, 1.5 weight % of stabilizer (Ca/Zn), 0.5 weight % of co-stabilizer, 10 weight % of 3-(aminopropyl)triethoxysilane protected by tert-Butyl carbamates and 1.3 weight % of commercial polyisocyanate: Desmodur BL 3272 MPA.

A glass surface was treated at ambient temperature with methyl-ethyl-ketone before being heated via infrared radiation to a temperature of 300° C. for 30 seconds. The PVC composition was applied by extrusion (Escuyer 40) under the following conditions:
die head temperature of 170° C., with a temperature profile of 160 to 180° C.; and
extrusion rate of 35 rpm.

The adhesion strength of the system obtained by extrusion and measured by the peel test after cooling was higher than 40 N.

EXAMPLE 10 OF THE INVENTION

A PVC composition was prepared using a PVC base (Kwert 65) containing 26 weight % of T8-10 plasticizer, 1.5 weight % of stabilizer (Ca/Zn), 0.5 weight % of co-stabilizer, 20 weight % of 3-(aminopropyl)triethoxysilane protected by tert-Butyl carbamates and 2.6 weight % of commercial polyisocyanate: Desmodur BL 3272 MPA.

A glass surface was treated at ambient temperature with methyl-ethyl-ketone before being heated via infrared radiation to a temperature of 300° C. for 30 seconds. The PVC composition was applied by extrusion (Escuyer 40) under the following conditions:
die head temperature of 170° C., with a temperature profile of 160 to 180° C.; and
extrusion rate of 35 rpm.

The adhesion strength of the system obtained by extrusion and measured by the peel test after cooling was higher than 40 N.

EXAMPLE 11

A PVC composition was prepared using a PVC base (Kwert 57) containing 26 weight % of T8-10 plasticizer, 1.5 weight % of stabilizer (Ca/Zn), 0.5 weight % of co-stabilizer, 10 weight % of 3-(aminopropyl)triethoxysilane protected by tert-Butyl carbamates and 2.6 weight % of commercial polyisocyanate: Desmodur BL 3272 MPA.

The glass surface was treated at ambient temperature with methyl-ethyl-ketone before being heated by infrared radiation to a temperature of 300° C. for 30 seconds. The PVC composition was applied by extrusion (Escuyer 40) under the following conditions:
die head temperature of 170° C., with a temperature profile of 160 to 180° C.; and
extrusion rate of 35 rpm.

The adhesion strength of the system obtained by extrusion and measured by the peel test after cooling was higher than 40 N.

EXAMPLE 12 OF THE INVENTION

A PVC composition was prepared using a PVC base (Kwert 65) containing 26 weight % of T8-10 plasticizer, 1.5 weight % of stabilizer (Ca/Zn), 0.5 weight % of co-stabilizer, 10 weight % of 3-(aminopropyl)triethoxysilane protected by tert-Butyl carbamates and 2.6 weight % of commercial polyisocyanate: Desmodur BL 3272 MPA.

The glass surface was treated at ambient temperature with methyl-ethyl-ketone before being heated in an oven to a temperature of 200° C. The PVC composition was applied by injection under the following conditions:
injection head temperature of 180° C., with a temperature profile of 165 to 180° C.;
temperature hold or cooling applied for 30 seconds;
mould closing pressure of 50 bars;
injection time of 1.6 seconds;
mould held at 35° C.

The PVC/glass system, immediately after release from the mould, was subjected to a temperature of 300° C.

The adhesion strength of the system obtained by injection was measured after cooling and was higher than 40 N.

EXAMPLE 13 OF THE INVENTION

A PVC composition was prepared using a PVC base (Kwert 65) containing 39 weight % of TOTM plasticizer, 1.5 weight % of stabilizer (Ca/Zn), 0.5 weight % of co-stabilizer, 1.4 weight % of 3-(aminopropyl)triethoxysilane and 0.85 weight % of commercial titanate complex: TNBT.

A metal surface in stainless steel was treated at ambient temperature with methyl-ethyl-ketone before being heated by infrared radiation to a temperature of 350° C. The PVC composition was applied by extrusion (Escuyer 40) under the following conditions:

die head temperature of 170° C., with a temperature profile of 160 to 180° C.; and extrusion rate of 35 rpm.

The adhesion strength of the system obtained by extrusion and measured by the peel test after cooling was higher than 40 N.

EXAMPLE 14 OF THE INVENTION

A PVC composition was prepared using a PVC base (Kwert 57) containing 39 weight % of TOTM plasticizer, 1.5 weight % of stabilizer (Ca/Zn), 0.5 weight % of co-stabilizer, 2.8 weight % of 3-(aminopropyl)triethoxysilane and 0.85 weight % of commercial titanate complex: Kr44.

A stainless steel surface was treated at ambient temperature with methyl-ethyl-ketone before being heated by infrared radiation to a temperature of 350° C. The PVC composition was applied by extrusion (Escuyer 40) under the following conditions:

die head temperature of 170° C., with a temperature profile of 160 to 180° C.; and extrusion rate of 35 rpm.

The adhesion strength of the system obtained by extrusion and measured by the peel test after cooling was higher than 40 N.

The invention claimed is:

1. Method for applying, to an inorganic surface, a self-adhesive PVC composition comprising a composition (C) comprising:

an optionally protected aminosilane; and at least one compound selected from among a titanium complex, zirconium complex and/or an optionally protected isocyanate compound;

said method comprising an activation step of said surface, selected from among heat treatment, a shot peening step, plasma treatment step, solvent cleaning and a silicification step.

2. The method according to claim 1 wherein the PVC composition, after the surface treatment step, is applied by injection moulding, by extrusion, by rotational moulding or by compression moulding.

3. The method according to claim 1, wherein the inorganic surface is a surface in glass or metal.

4. The method according to claim 1, wherein the inorganic surface is in glass.

5. The method according to claim 1, wherein the inorganic surface is in metal.

6. The method according to claim 4, wherein the composition (C) comprises:

an optionally protected aminosilane; and a protected isocyanate or a titanium complex.

7. The method according to claim 4, wherein surface activation is performed by heat treatment.

8. The method according to claim 4, wherein the application of the PVC composition is performed by extrusion.

9. The method according to claim 5, wherein the composition (C) comprises:

an optionally protected aminosilane; and a protected isocyanate or a titanium complex.

10. The method according to claim 5, wherein surface activation is performed by heat treatment, preferably via radiating heat.

11. The method according to claim 5, wherein application of the PVC composition is performed by extrusion.

\* \* \* \* \*